United States Patent
Ko et al.

(10) Patent No.: US 11,539,784 B2
(45) Date of Patent: Dec. 27, 2022

(54) CONTENT-BASED DISTRIBUTION AND EXECUTION OF ANALYTICS APPLICATIONS ON DISTRIBUTED DATASETS

(71) Applicant: INTERNATIONAL BUSINESS MACHINES CORPORATION, Armonk, NY (US)

(72) Inventors: Bong Jun Ko, Harrington Park, NJ (US); Theodoros Salonidis, Boston, MA (US); Rahul Urgaonkar, Shoreline, WA (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 15/189,730

(22) Filed: Jun. 22, 2016

(65) Prior Publication Data
US 2017/0371718 A1    Dec. 28, 2017

(51) Int. Cl.
*H04L 67/10* (2022.01)
*G06F 16/951* (2019.01)
*G06F 9/50* (2006.01)

(52) U.S. Cl.
CPC ............ *H04L 67/10* (2013.01); *G06F 9/5044* (2013.01); *G06F 16/951* (2019.01)

(58) Field of Classification Search
CPC ..... G06F 9/4856; G06F 9/5044; H04L 43/04; H04L 45/12; H04L 45/123; H04L 45/127;
(Continued)

(56) References Cited

U.S. PATENT DOCUMENTS

2006/0190942 A1* 8/2006 Inoue ............... G06F 9/4856
718/100
2008/0059557 A1* 3/2008 DeSantis ............ G06F 9/5044
709/201
(Continued)

FOREIGN PATENT DOCUMENTS

CN        103546765 A  *  1/2014
EP    WO2017157447 A1  *  9/2017   ........... H04L 47/125

OTHER PUBLICATIONS

Peebles, et al., "System Architecture for Distributed Data Management", ip.com., IEEE Computer, Nov. 2005, 14 pages, vol. 11 No. 1.
(Continued)

*Primary Examiner* — Lewis A Bullock, Jr.
*Assistant Examiner* — Kevin X Lu
(74) *Attorney, Agent, or Firm* — Tutunjian & Bitetto, P.C.; Vazken Alexanian (57) ABSTRACT

Methods are provided. A method includes announcing to a network meta information describing each of a plurality of distributed data sources. The method further includes propagating the meta information amongst routing elements in the network. The method also includes inserting into the network a description of distributed datasets that match a set of requirements of the analytics task. The method additionally includes delivering, by the routing elements, a copy of the analytics task to locations of respective ones of the plurality of distributed data sources that include the distributed datasets that match the set of requirements of the analytics task.

6 Claims, 9 Drawing Sheets

(58) Field of Classification Search
CPC ....... H04L 45/26; H04L 45/44; H04L 45/563; H04L 67/10
See application file for complete search history.

(56) References Cited

U.S. PATENT DOCUMENTS

| | | | | |
|---|---|---|---|---|
| 2011/0246997 | A1* | 10/2011 | Sitaraman | G06Q 10/06 718/103 |
| 2013/0132967 | A1* | 5/2013 | Soundararajan | G06F 9/5066 718/104 |
| 2013/0346987 | A1* | 12/2013 | Raney | G06F 9/5044 718/102 |
| 2014/0006534 | A1* | 1/2014 | Jain | G06F 9/5094 709/208 |
| 2014/0025415 | A1 | 1/2014 | Venkataraman et al. | |
| 2014/0085480 | A1* | 3/2014 | Saptharishi | G06F 16/71 348/159 |
| 2014/0173232 | A1* | 6/2014 | Reohr | H04L 67/1097 711/162 |
| 2014/0192717 | A1 | 7/2014 | Liu et al. | |
| 2014/0244701 | A1 | 8/2014 | Welton et al. | |
| 2016/0094420 | A1* | 3/2016 | Clemm | H04L 43/04 709/224 |
| 2016/0179581 | A1* | 6/2016 | Soundararajan | G06F 9/5033 718/104 |
| 2016/0255535 | A1* | 9/2016 | De Foy | H04L 67/2842 370/236 |
| 2017/0053242 | A1* | 2/2017 | Ayyaswami | G06F 16/22 |
| 2017/0103360 | A1* | 4/2017 | Ristock | H04L 67/18 |

OTHER PUBLICATIONS

Jaffe, et al., "Efficient Scheduling of Tasks Without Full Use of Processor Resources", ip.com.,MIT Laboratory for Computer Science, Apr. 2007, 85 pages.

* cited by examiner

CONTENT-BASED DISTRIBUTION AND EXECUTION OF ANALYTICS APPLICATIONS ON DISTRIBUTED DATASETS

BACKGROUND

Technical Field

The present invention relates generally to information processing and, in particular, to content-based distribution and execution of analytics applications on distributed datasets.

Description of the Related Art

The existing practice of data analytics typically involves collecting and storing a dataset in some storage device at a single location, and executing analytics application on that dataset, using a variety of analytic execution models including parallel processing frameworks, such as MapReduce.

However, when the datasets are geographically distributed, it is often difficult to move the data into a single location, due to many constraints such as, for example, data size, network bandwidth, the delay sensitive nature of the analytics job on the data, and regulatory concerns on security and privacy of the data. In such cases, it is desirable to distribute and execute the analytics functions in locations closer to where data is stored/generated. To do so, it is necessary to (i) identify the location where the datasets for particular analytics job are stored/generated, (ii) determine where to run analytics tasks (and sometimes which portions of the analytics to run where), and (iii) deploy the analytics tasks to the identified locations and execute them.

Such tasks, however, poses significant challenges in situations that the churn rate of distributed datasets are high and/or the datasets to be analyzed are not known a priori but need to be discovered/identified on-the-fly (e.g., a machine learning task involving pattern analysis from a large set of end-user-provided, crowd-sourced camera images).

While a large body of existing content-based networking literature exists, however, the same only addresses identifying the contents or services in the network, but does not address the issue of moving the analytics application codes to distributed locations.

Thus, there is a need for content-based distribution and execution of analytics on distributed datasets.

SUMMARY

According to an aspect of the present principles, a method is provided. The method includes announcing to a network meta information describing each of a plurality of distributed data sources. The method further includes propagating the meta information amongst routing elements in the network. The method also includes inserting into the network a description of distributed datasets that match a set of requirements of the analytics task. The method additionally includes delivering, by the routing elements, a copy of the analytics task to locations of respective ones of the plurality of distributed data sources that include the distributed datasets that match the set of requirements of the analytics task.

According to another aspect of the present principles, a method is provided. The method includes broadcasting, by network routing elements, an analytics task to a network. The method further includes self-determining each of a plurality of distributed data sources that include a distributed dataset that matches requirements of the analytics task. The method also includes discarding the analytics task, by any of the plurality of distributed data sources that lack the distributed dataset that matches the requirements of the analytics task. The method additionally includes executing the analytics task, by hardware processing elements at the locations of each of the plurality of distributed data sources that include the distributed dataset that matches the requirements of the analytics task.

According to yet another aspect of the present principles, a method is provided. The method includes inserting into a network a container that includes all of the steps of a multi-step analytics task. The method further includes propagating, by network routing elements, the container among the nodes in the network. The method also includes determining whether a given one of the nodes is capable of executing a step of the multi-step analytics task, responsive to the package arriving at the given one of the nodes. The method additionally includes executing the step, removing the step from the container, and including the execution results for the step in the container, responsive to the given one of the nodes being determined capable of executing the step. The method further includes repeating said propagating, determining and executing steps for remaining steps of the multi-step analytics task until all of the steps of the multi-step analytics task are executed.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to content-based distribution and execution of analytics applications on distributed datasets.

In an embodiment, the present principles use a content-based (or information-centric) networking approach to solving the problem of distributing and executing analytics applications on distributed datasets.

The present principles advantageously solve the problem of executing analytics tasks on distributed datasets, in which the discovery/identification of the datasets, the determination of locations to run analytics tasks, and the deployment and execution of the analytics tasks are performed in a fully distributed manner. Thus, the present principles enable more scalable and fault-tolerant solutions than conventional methods that involve either collecting the datasets and executing the analytics in a single location or distributing and executing the analytics in a pre-determined location on pre-determined datasets.

Figure 1:
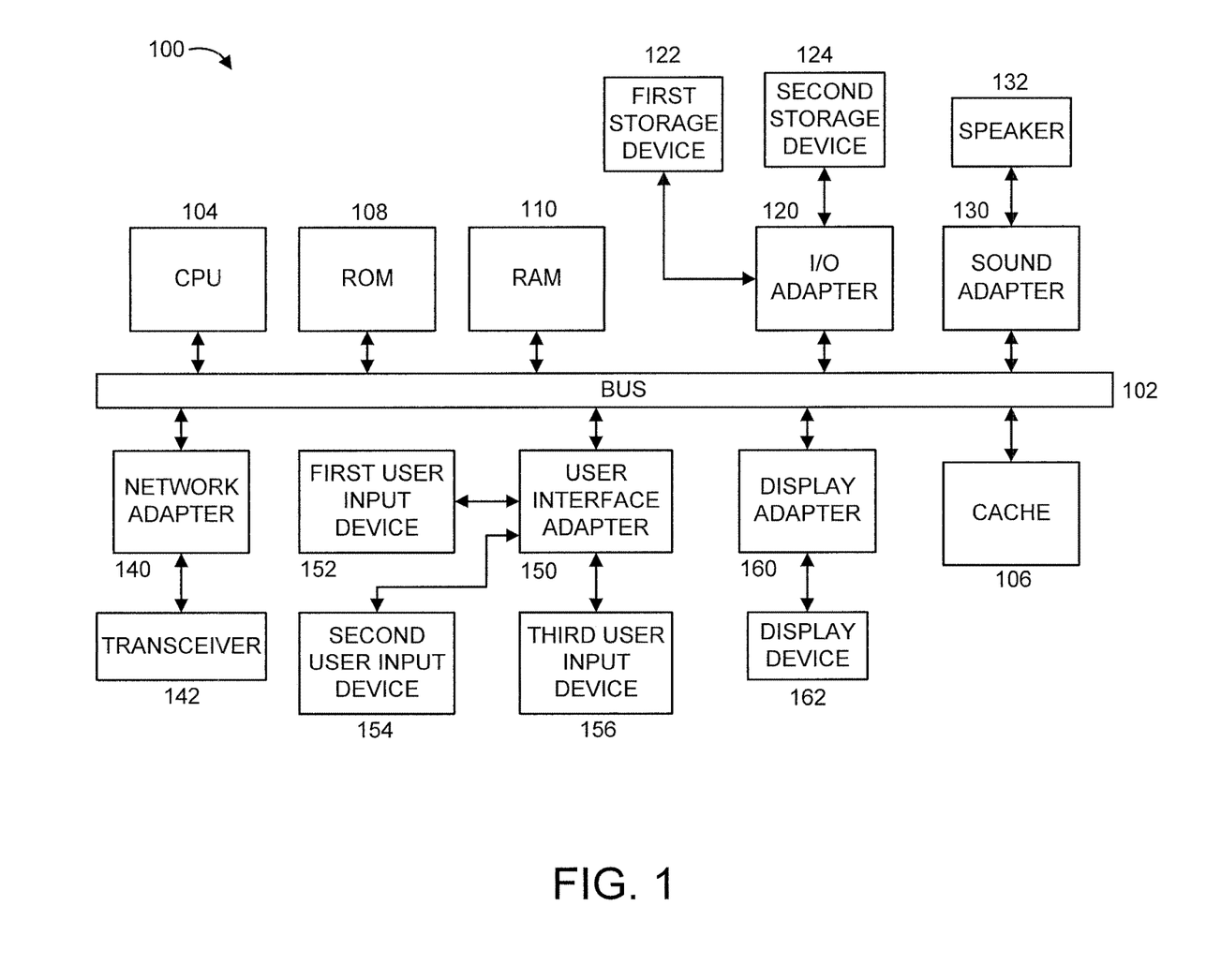
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) (also interchangeably referred to as a "processing element") 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

In the embodiment shown in FIG. 1, the elements thereof are interconnected by a bus(es)/network(s) 102. However, in other embodiments, other types of connections can also be used. Moreover, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 1 can be implemented in a cloud configuration including, for example, in a distributed configuration. Additionally, one or more elements in FIG. 1 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
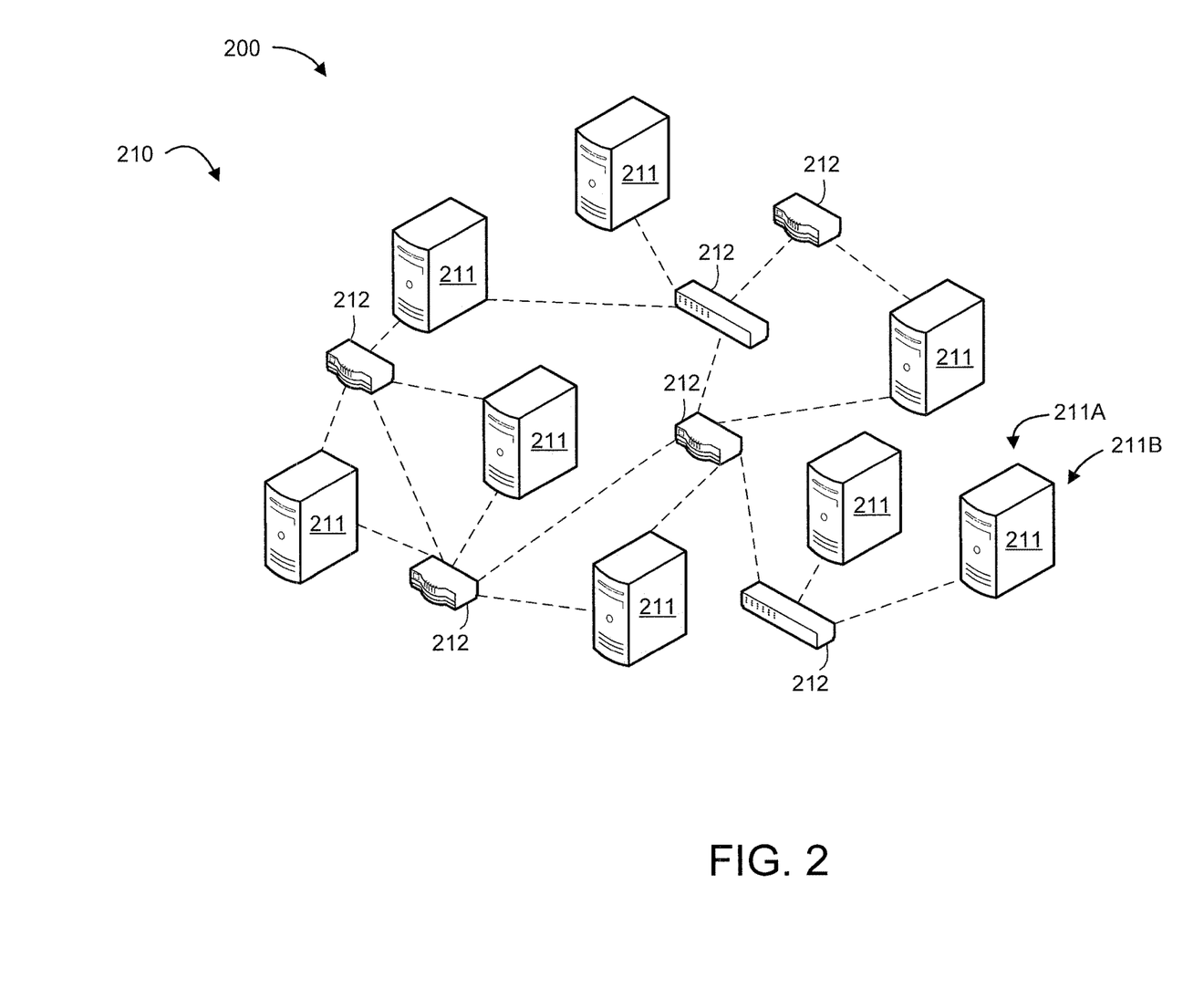
FIG. 2 shows an exemplary content-based network to which the present principles can be applied, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
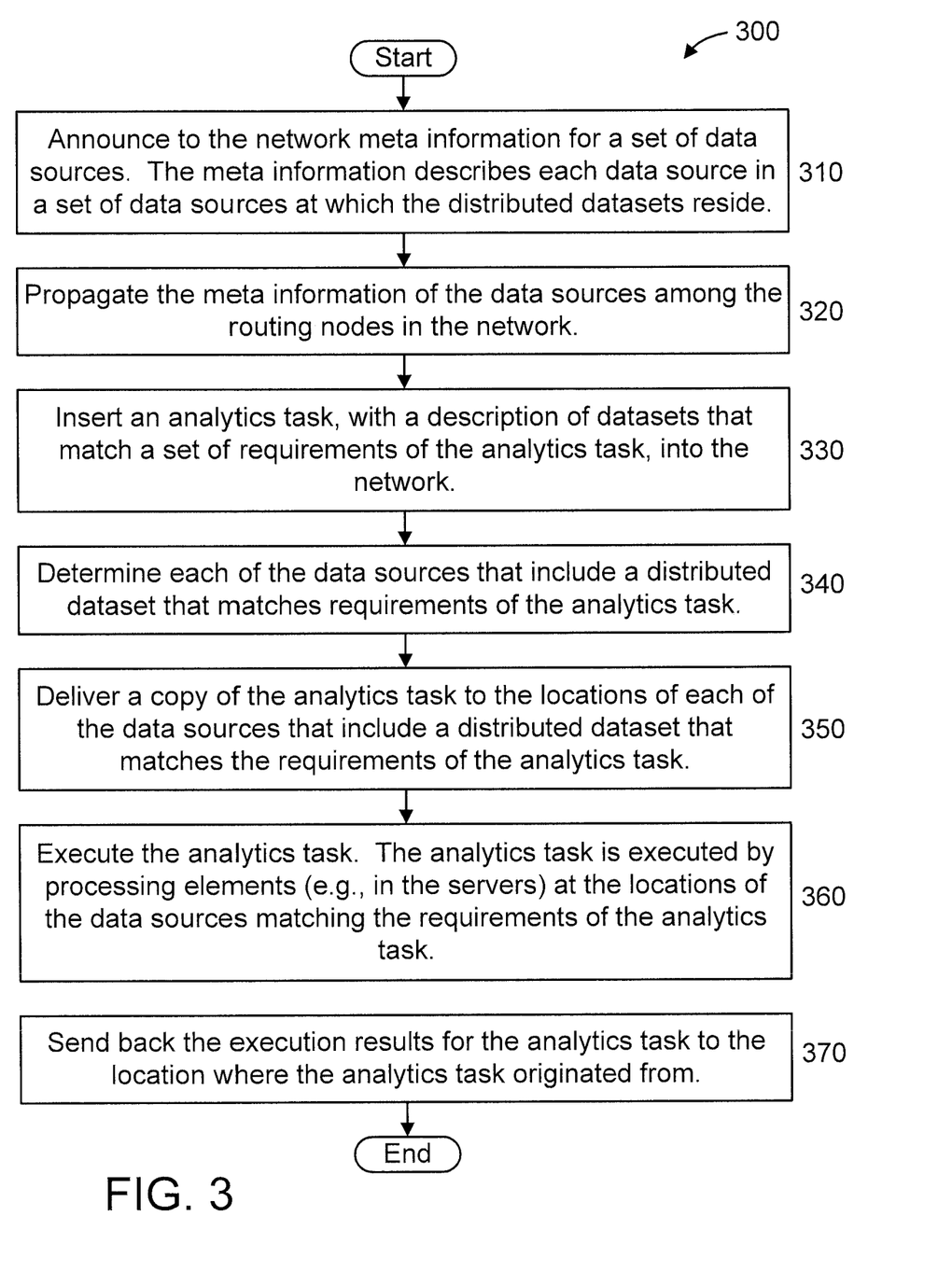
FIG. 3 shows an exemplary method for content-based distribution and execution of analytics applications on distributed datasets, in accordance with an embodiment of the present principles.
Figure 4:
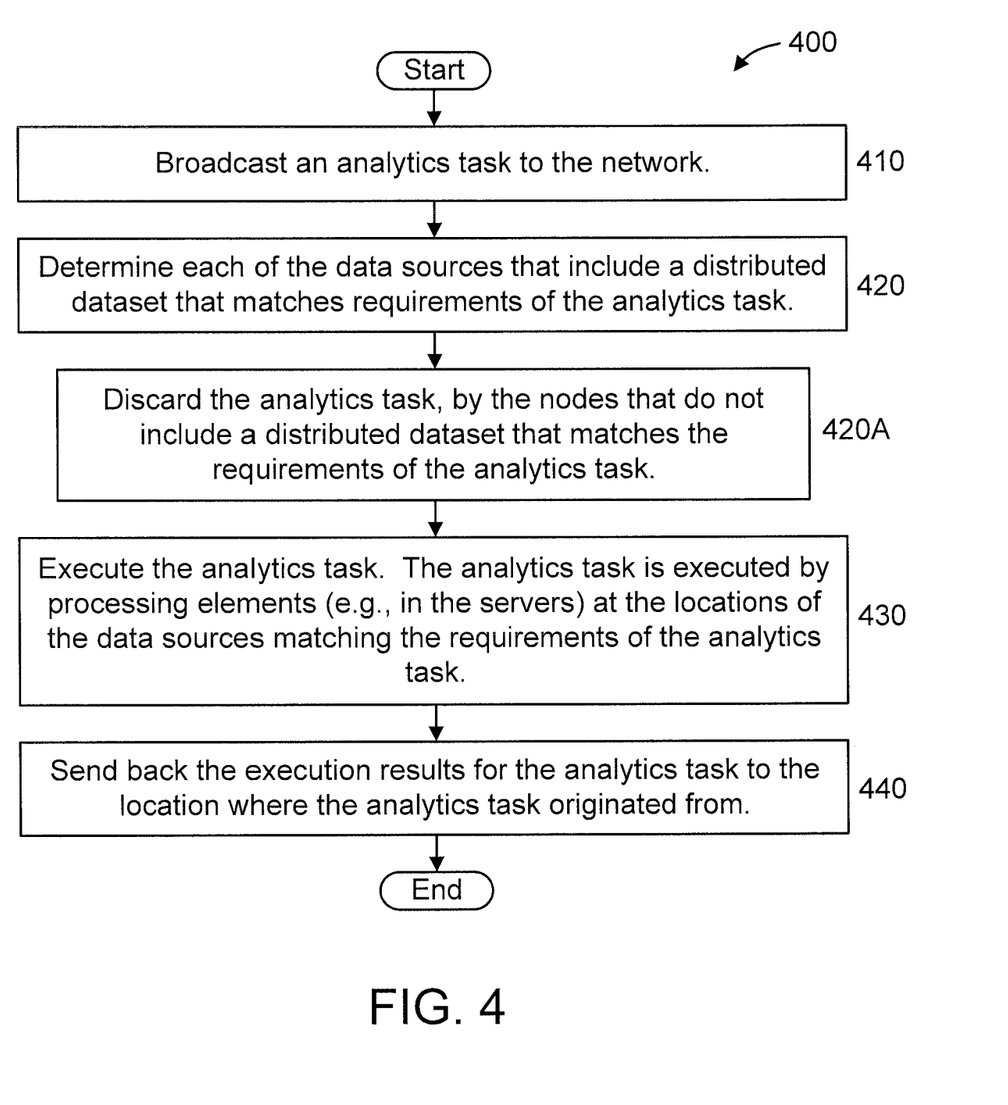
FIG. 4 shows another exemplary method for content-based distribution and execution of analytics applications on distributed datasets, in accordance with an embodiment of the present principles.
Figure 5:
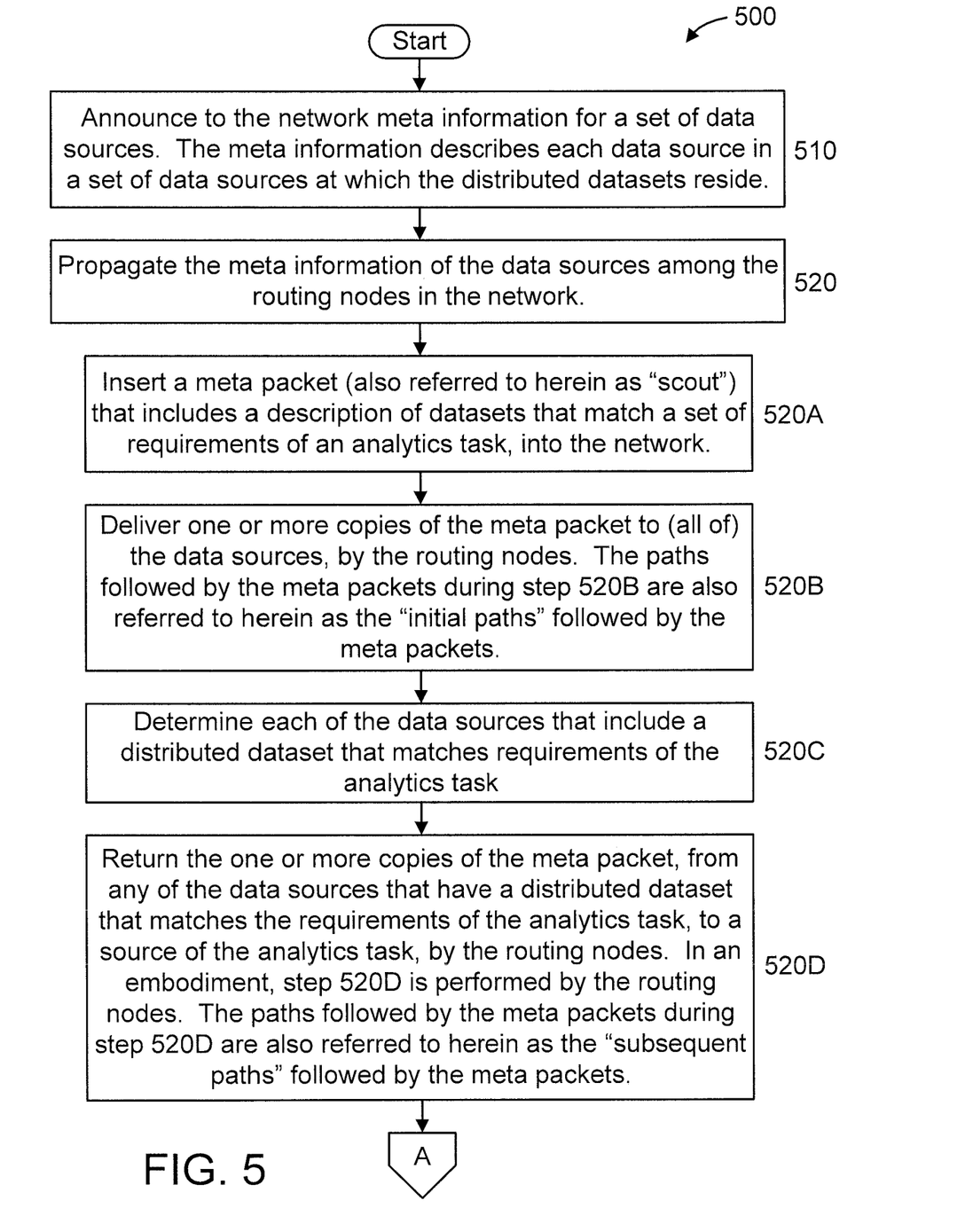
FIGS. 5-6 show yet another exemplary method for content-based distribution and execution of analytics applications on distributed datasets, in accordance with an embodiment of the present principles.
Figure 6:
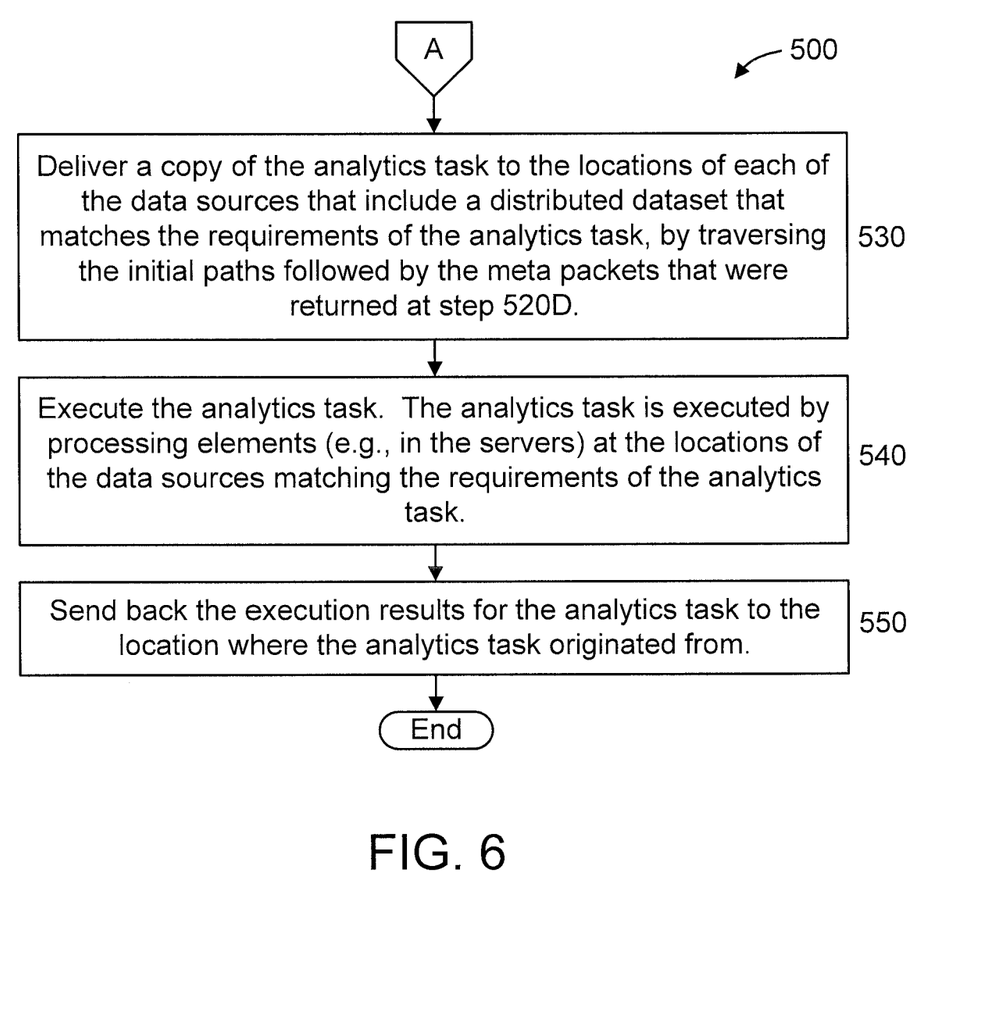
Figure 7:
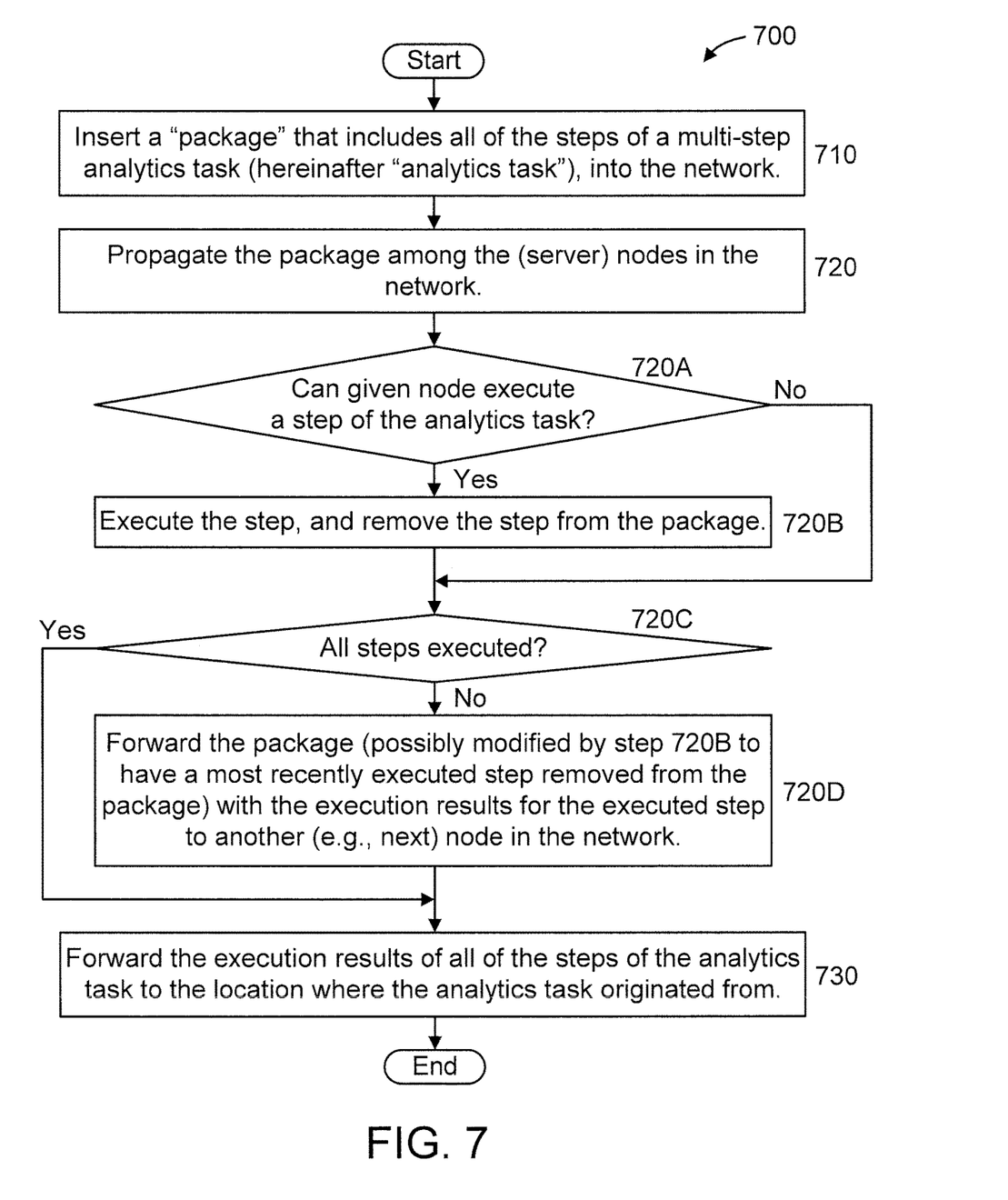
FIG. 7 shows still another exemplary method for content-based distribution and execution of analytics applications on distributed datasets, in accordance with an embodiment of the present principles.

Further, it is to be appreciated that processing system 100 may perform at least part of the method described herein including, for example, at least part of method 300 of FIG. 3 and/or at least part of method 400 of FIG. 4 and/or at least part of method 500 of FIGS. 5-6 and/or at least part of method 700 of FIG. 7. Similarly, part or all of system 200 may be used to perform at least part of method 300 of FIG. 3 and/or at least part of method 400 of FIG. 4 and/or at least part of method 500 of FIGS. 5-6 and/or at least part of method 700 of FIG. 7.

FIG. 2 shows an exemplary content-based network 200 to which the present principles can be applied, in accordance with an embodiment of the present principles.

The content-based network 200 involves a network that includes a set of nodes 210.

The set of nodes 210 includes a set of server nodes (hereinafter interchangeable referred to as "servers" in short) 211 and a set of routing nodes (hereinafter interchangeably referred to as "routers" in short) 212. In an embodiment, there can be overlap between the different types of nodes such that both types are embodied at a single node.

The servers 211 are in distributed locations and are configured as distributed data sources 211A having distributed datasets 211B stored therein. The datasets 211B may have also been generated by the servers 211 or may have been sent to the servers 211 for storage. Thus, while shown with respect to one of the servers 211 for the sake of illustration, the reference numerals 211A and 211B can be applicable to each of the server nodes 211.

Each of the servers 211 is also configured to execute analytics tasks on the datasets 211B stored therein.

The routers 212 are configured to perform routing functions. The routers/routing nodes 212 can include any type of network routing element including, for example, but not limited to, routers, switches, and so forth. Moreover, in an embodiment, the routers 212 are configured to announce meta information describing each of the data sources 211A. The meta information describing each of the data sources 211A includes information describing the distributed datasets 211B stored in the servers 211 and the locations of the servers 211.

The servers 211 and/or the routers 212 are also configured to insert an analytic task into the network along with a description of distributed datasets that match a set of requirements of the analytics task.

The routers 212 are further configured to deliver one or more copies of the analytic task to respective locations of respective ones of the distributed data sources 211A that include the distributed datasets 211B that match the set of requirements of the analytics task.

The implicated servers 211 then execute the analytics task using the distributed datasets 211B that match the set of requirements of the analytics task.

It is to be appreciated that while the embodiment of FIG. 2 describes the servers 211 as both including data sources and also being able to execute analytics tasks on the data sources, in other embodiments, the set of nodes 210 can includes nodes that are used strictly as storage nodes and other nodes that are used strictly for computing nodes. The term server can embody any one of both of these concepts, as readily appreciated by one of ordinary skill in the art.

FIG. 3 shows an exemplary method 300 for content-based distribution and execution of analytics applications on distributed datasets, in accordance with an embodiment of the present principles.

At step 310, announce to the network meta information for a set of data sources. The meta information describes each data source in a set of data sources at which the distributed datasets reside. For example, such meta information can include, but is not limited to, a location of each data source, a type of dataset stored at the data source, parameters of the data in the dataset stored at the data source such as the schema of a database that holds the dataset, and so forth.

At step 320, propagate the meta information of the data sources among the routing nodes in the network. In an embodiment, step 320 is performed by the routing nodes themselves.

At step 330, insert an analytics task, with a description of datasets that match a set of requirements of the analytics task, into the network.

At step 340, determine each of the data sources that include a distributed dataset that matches requirements of the analytics task. In an embodiment, step 340 is performed based on matching criteria between the analytics task and the data sources.

At step 350, deliver a copy of the analytics task to the locations of each of the data sources that include a distributed dataset that matches the requirements of the analytics task. In an embodiment, step 350 is performed by the routing nodes.

At step 360, execute the analytics task. The analytics task is executed by processing elements (e.g., in the servers) at the locations of the data sources matching the requirements of the analytics task.

At step 370, send back the execution results for the analytics task to the location where the analytics task originated from.

In an embodiment, steps 330 and 350 involve directly inserting the codes to run the analytics tasks into the network, and forwarding the codes (by the routing nodes) to the nodes closest to the data source that matches the requirements. When there is more than one data source that matches the requirement, the routing nodes create copies of the codes, each of which is delivered to and executed in each location that holds the data source.

In another embodiment (FIG. 4), the routing nodes are oblivious of the location of the data sources (hence the meta information of data sources is not known to the routing nodes, and the method (of FIG. 4) involves broadcasting the analytics task (codes) throughout the network, and only nodes that hold the matching data source execute the analytics task (codes), while other nodes silently discard the codes.

FIG. 4 shows another exemplary method 400 for content-based distribution and execution of analytics applications on distributed datasets, in accordance with an embodiment of the present principles.

At step 410, broadcast an analytics task to the network.

At step 420, determine each of the data sources that include a distributed dataset that matches requirements of the analytics task. In an embodiment, step 340 is performed based on matching criteria between the analytics task and the data sources.

In an embodiment, step 420 includes step 420A.

At step 420A, discard the analytics task, by the nodes that do not include a distributed dataset that matches the requirements of the analytics task.

At step 430, execute the analytics task. The analytics task is executed by processing elements (e.g., in the servers) at the locations of the data sources matching the requirements of the analytics task.

At step 440, send back the execution results for the analytics task to the location where the analytics task originated from.

In yet another embodiment (FIGS. 5-6), method 300 of FIG. 3 is modified to include two phases. In the first phase, a meta packet (called "scout") that includes the data requirements of the analytics task is inserted into the network, the routing nodes deliver (copies of) the scout to the data sources, and upon reaching (finding) the location of data sources, the scouts are delivered back to the source of the analytics following the reverse-paths.

In the second phase, the actual analytics codes are delivered to the locations of the data sources following the same path traversed by the scouts.

This method is useful particularly when the present locations of the matching data sources are not precisely known by the network, and reduces the amount of traffic consumed by moving the analytics codes unnecessarily to locations that would turn out not to be holding the matching data sources.

FIGS. 5-6 show yet another exemplary method 500 for content-based distribution and execution of analytics applications on distributed datasets, in accordance with an embodiment of the present principles.

At step 510, announce to the network meta information for a set of data sources. The meta information describes each data source in a set of data sources at which the distributed datasets reside.

At step 520, propagate the meta information of the data sources among the routing nodes in the network. In an embodiment, step 520 is performed by the routing nodes themselves.

At step 520A, insert a meta packet (also referred to herein as "scout") that includes a description of datasets that match a set of requirements of an analytics task, into the network.

At step 520B, deliver one or more copies of the meta packet to (all of) the data sources, by the routing nodes. The paths followed by the meta packets during step 520B are also referred to herein as the "initial paths" followed by the meta packets.

At step 520C, determine each of the data sources that include a distributed dataset that matches requirements of the analytics task. In an embodiment, step 520C is performed based on matching criteria between the analytics task and the data sources.

At step 520D, return the one or more copies of the meta packet, from any of the data sources that have a distributed dataset that matches the requirements of the analytics task, to a source of the analytics task, by the routing nodes. In an embodiment, step 520D is performed by the routing nodes. The paths followed by the meta packets during step 520D are also referred to herein as the "subsequent paths" followed by the meta packets.

At step 530, deliver a copy of the analytics task to the locations of each of the data sources that include a distributed dataset that matches the requirements of the analytics task, by traversing the initial paths followed by the meta packets that were returned at step 520D. In an embodiment, step 530 is performed by the routing nodes.

At step 540, execute the analytics task. The analytics task is executed by processing elements (e.g., in the servers) at the locations of the data sources matching the requirements of the analytics task.

At step 550, send back the execution results for the analytics task to the location where the analytics task originated from.

In still another embodiment (FIG. 7), the analytics task includes more than one step, each of which can be executed at different locations, either due to a limit in the processing capacity of each location or due to each location holding different datasets required for different steps of the analytics task. In this case, (1) a package (e.g., container) including the entire steps of the analytics task is inserted into the network, (2) when the package reaches a location that can execute the first step of the analytics task, the first step is executed at the location, and the package including the remaining steps is inserted into the network along with the result of the first step, and (3) the process is repeated until all steps are executed and the final result is delivered to the origin of the analytics task. The steps may be processed sequentially starting with the first step to ensure data integrity. In another embodiment, information can be included in the package regarding the steps such as, for example, any constraints on processing of the steps (e.g., processing order, etc.) to allow for more efficient execution using, for example, parallel processing, and so forth.

FIG. 7 shows still another exemplary method 700 for content-based distribution and execution of analytics applications on distributed datasets, in accordance with an embodiment of the present principles.

At step 710, insert a "package" that includes all of the steps of a multi-step analytics task (hereinafter "analytics task"), into the network.

At step 720, propagate the package among the (server) nodes in the network. In an embodiment, step 720 is performed by the routing nodes.

In an embodiment, step 720 includes steps 720A-D.

At step 720A upon the package arriving at a given node, determine whether the given node can execute a step of the analytics task. If so, then proceed to step 720B. Otherwise, proceed to step 720C. In an embodiment, step 720A is performed based on matching criteria between (the step of) the analytics task and the data sources.

At step 720B, execute the step, and remove the step from the package.

At step 720C, determine whether all steps have been executed. If so, then proceed to step 630. Otherwise, proceed to step 720D.

At step 720D, forward the package (possibly modified by step 720B to have a most recently executed step removed from the package) with the execution results for the executed step to another (e.g., next) node in the network.

At step 730, forward the execution results of all of the steps of the analytics task to the location where the analytics task originated from.

In content-based (or information-centric) networking, the searching and delivery of contents in the network is handled by network nodes (e.g., routers and switches), such that the requests to the contents are made directly to the network based on the identifying information of the contents, rather than using the conventional mechanism of indirection involving (i) first identifying the location of the wanted contents and (ii) then requests being made to the locations that hold the contents.

The present principles use the content-based networking concept to identify the data sources required by analytics tasks, deliver the analytics tasks toward the data sources, and execute the analytics tasks at location near the data source in a fully distributed manner.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
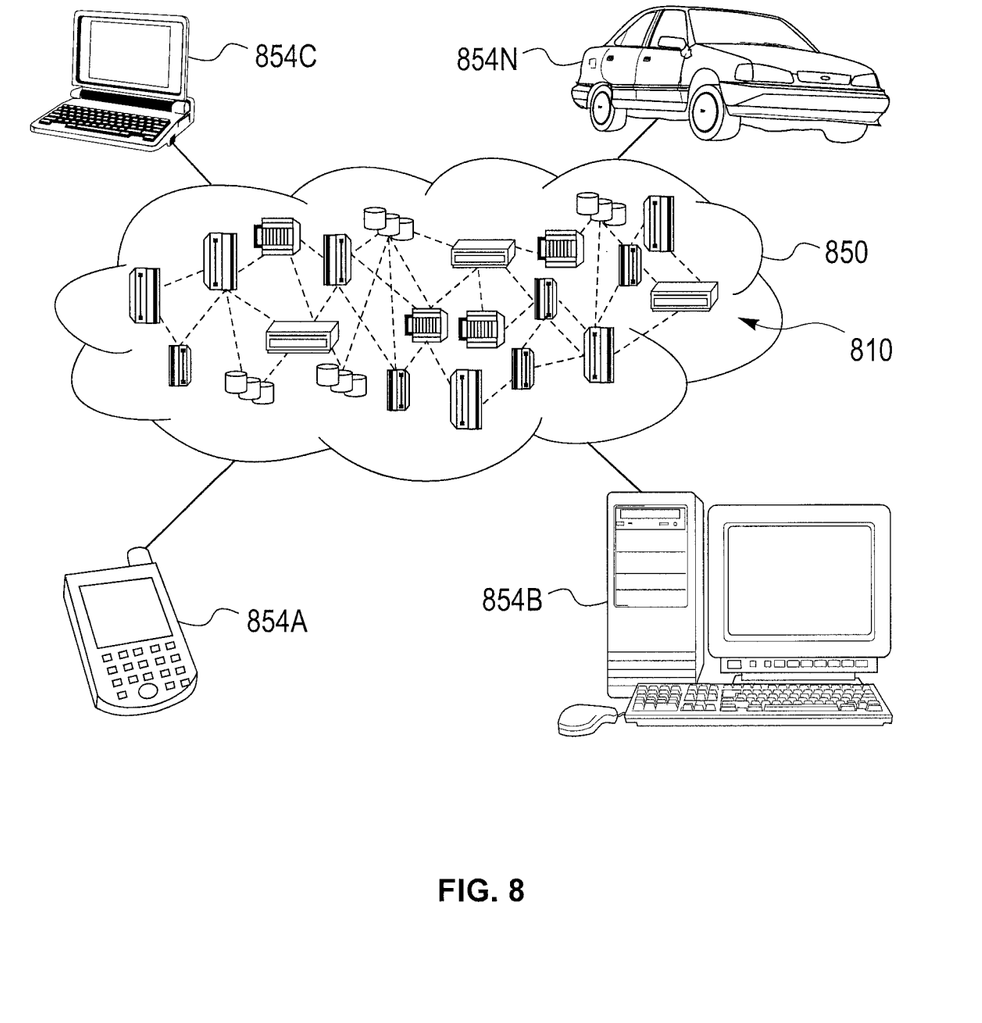
FIG. 8 shows an exemplary cloud computing environment, in accordance with an embodiment of the present principles.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
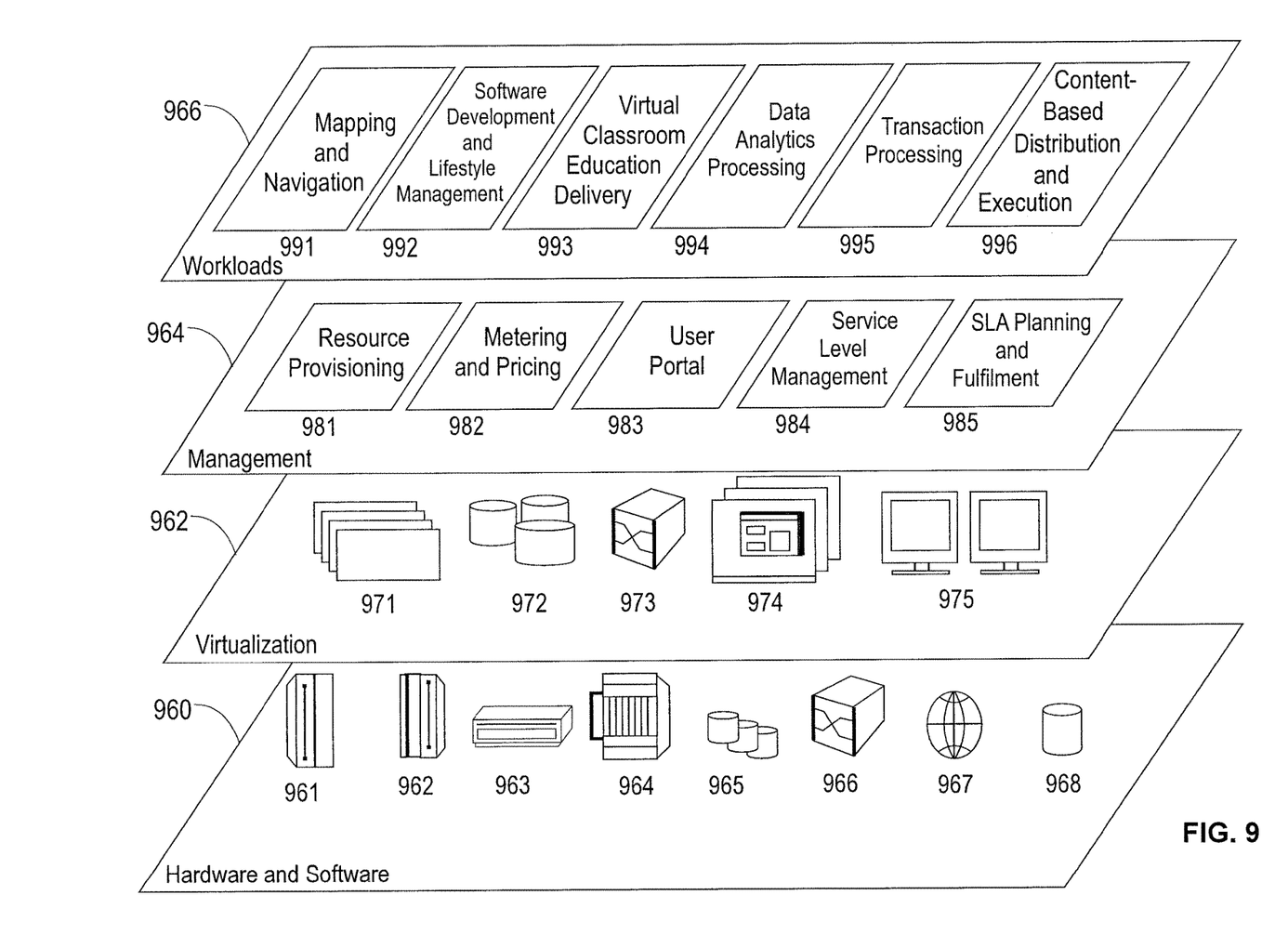
FIG. 9 shows an exemplary set of functional abstraction layers provided by the cloud computing environment shown in FIG. 8, in accordance with an embodiment of the present principles.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and content-based distribution and execution of analytics applications on distributed datasets 996.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A method, comprising:
   inserting, from a source of an analytics task into a network, a scout packet which includes a description of distributed datasets that match a set of requirements of the analytics task, the description including parameters of the distributed datasets;
   delivering, by routing elements of the network, one or more copies of the scout packet to a plurality of distributed data sources residing in the network by traversing respective initial paths to the plurality of distributed data sources;
   determining each of the plurality of distributed data sources that matches the set of requirements of the analytics task;
   returning, by the routing elements, the one or more copies of the scout packet and the initial paths traversed by one or more copies of the scout packet, from the determined distributed data sources of the plurality of distributed data sources that have a distributed dataset matching the set of requirements of the analytics task, to the source of the analytics task;
   delivering a copy of the analytics task to only each of the determined distributed data sources of the plurality of distributed data sources that include a distributed data set that matched the requirements of the analytics task following the same paths as the initial paths traversed by the one or more copies of the scout packet;
   executing the analytics task by hardware processing elements at the determined distributed data sources of the plurality of distributed data sources that include the distributed datasets that match the set of requirements of the analytics task; and
   returning execution results for the analytics task to the source of the analytics task.

2. The method of claim 1, wherein said step of delivering the one or more copies of the scout packet is performed based on certain matching criteria between the analytics task and the plurality of distributed data sources.

3. The method of claim 1, wherein the analytics task is separately executed a number of times equal to a number of the respective ones of the plurality of distributed data sources that include the distributed datasets that match the set of requirements of the analytics task.

4. The method of claim 1, wherein said inserting step comprises further inserting the analytics task into the network.

5. The method of claim 1, further comprising returning the meta packet back to a source of the analytics task, from only the respective ones of the plurality of distributed data sources that include the distributed datasets that match the set of requirements of the analytics task.

6. A non-transitory article of manufacture tangibly embodying a computer readable program which when executed causes a computer to perform the steps of claim 1.

* * * * *